United States Patent [19]
Dennis et al.

[11] 3,967,235
[45] June 29, 1976

[54] ACOUSTIC VELOCITY LOGGING SYSTEM

[75] Inventors: Charles L. Dennis, De Soto; Joseph Zemanek, Jr., Dallas, both of Tex.

[73] Assignee: Mobil Oil Corporation, New York, N.Y.

[22] Filed: July 17, 1974

[21] Appl. No.: 489,214

[52] U.S. Cl. ............... 340/15.5 DS; 340/15.5 BH; 346/33 WL; 346/33 MC; 340/18 R
[51] Int. Cl.² ......................................... G01V 1/40
[58] Field of Search ............ 340/15.5 DS, 15.5 BH, 340/15.5 TN, 18 R; 346/33 WL, 33 MC

[56] References Cited
UNITED STATES PATENTS

| | | | |
|---|---|---|---|
| 2,756,404 | 7/1956 | Anderson et al. | 346/33 M |
| 2,839,615 | 6/1958 | Sarratt | 346/33 M |
| 2,946,393 | 7/1960 | Hawkins | 340/15.5 DS |
| 3,207,256 | 9/1965 | Blizard | 340/15.5 TN |
| 3,281,773 | 10/1966 | Newman | 340/15.5 TN |
| 3,299,400 | 1/1967 | Trowbridge et al. | 340/15.5 TN |
| 3,503,037 | 3/1970 | Smith, Jr. | 340/15.5 DS |
| 3,781,783 | 12/1973 | Tucker | 340/15.5 DS |

*Primary Examiner*—Maynard R. Wilbur
*Assistant Examiner*—H. A. Birmiel
*Attorney, Agent, or Firm*—C. A. Huggett; George W. Hager, Jr.

[57] ABSTRACT

An acoustic velocity logging tool employs a transmitter and a pair of receivers. Acoustic pulses from the transmitter pass through the formation surrounding the borehole to the receivers. The received signals, along with control signals, are transferred to an uphole recording system. A record unit operates to apply these receiver and control signals to a magnetic tape recorder. A playback unit transfers the recorded receiver signals to the intensity modulation input of a cathode-ray oscilloscope and, in response to the recorded control signals, applies a trigger pulse to the sweep input of the cathode-ray oscilloscope. A film recorder makes a continuous film recording of the receiver signals as they appear as variable-density traces on the face of the cathode-ray oscilloscope.

10 Claims, 19 Drawing Figures

PLAYBACK UNIT

ACOUSTIC VELOCITY LOGGING SYSTEM

BACKGROUND OF THE INVENTION

This invention relates to a recording system for use with an acoustic velocity logging tool.

In the exploration for petroleum and other minerals, well logging techniques are employed to determine the character of subsurface formations penetrated by a borehole. One technique of logging these characteristics employs a logging tool including a transmitter of acoustic pulses and a receiver, or receivers, for detecting these acoustic pulses after they have traversed the subsurface formations adjacent the tool. By measuring the traveltime of acoustic energy from the transmitter through the formation to the receiver, an indication of the velocity of acoustic energy through the subsurface formation is obtained and this acoustic velocity is an indication of the character of the subsurface formation. By recording the acoustic velocity in correlation with depth of borehole as the tool moves through the borehole, there is obtained a log of the characteristics of the subsurface formations as a function of depth. Such logs are quite useful, particularly in the exploration for oil-bearing subsurface strata.

In U.S. Pat. No. 3,302,166 to Joseph Zemanek, Jr., there is disclosed an acoustic velocity logging system wherein a downhole tool comprises a plurality of transducers including a transmitter and multiple receivers. The receivers are spaced at different distances from the transmitter such that an acoustic pulse from the transmitter arrives at the receviers by way of different travel paths through the formation surrounding the borehole. Upon generation of an acoustic pulse by the transmitter, a transmitter trigger pulse is transmitted uphole by way of a conductor in the logging cable. The signals produced by the receivers in response to the arrival of the acoustic pulse at the receivers are also transmitted uphole by way of conductors within the logging cable. The logging system is provided with downhole gating circuits which permit the first acoustic pulse to be detected and sent uphole by a first receiver, the second acoustic pulse to be detected and sent uphole by a second receiver, the third acoustic pulse to be detected and sent uphole by a third receiver, and the fourth acoustic pulse to be detected and sent uphole by a fourth receiver. The cycle is then repeated with successive acoustic pulses being detected and transmitted uphole by successive ones of the receivers. The time interval between the generation of each acoustic pulse and the detection of that pulse at a particular receiver is recorded. These time intervals are combined to provide an indication of acoustic velocity of formations adjacent the logging tool. In such a system, the influence of variations on the acoustic velocity measurement caused by the borehole medium as the acoustic pulses travel to and from the borehole tool is eliminated so that the measurements are dependent solely upon the character of the subsurface formations surrounding the borehole.

SUMMARY OF THE INVENTION

The present invention is directed to a new method and system by which acoustic velocity logging signals may be recorded and displayed.

In accordance with such invention, there is provided a borehole logging tool having a transmitter of acoustic pulses and a pair of receivers located at spaced-apart, axial distances from the transmitter. A pulse generator energizes the transmitter and also produces a transmitter trigger pulse each time the transmitter is energized. Each receiver produces an output signal representative of the acoustic pulses traveling through the formation surrounding the borehole from the transmitter to the receiver. These receiver output signals are sequentially gated for each transmitter trigger pulse. There is also produced a receiver select signal having two states, a first state indicating that one of the receiver signals is being gated at that time and a second state indicating that the other of the receiver signals is being gated at that time. These transmitter trigger pulses, receiver signals, and receiver select signals are recorded uphole. The recorded receiver signals are thereafter applied to the intensity modulation input of a cathode-ray oscilloscope (CRO), while the recorded transmitter trigger pulses and recorded receiver select signals are gated to provide a pair of CRO trigger pulses for use in triggering the electron beam sweep of a cathode-ray oscilloscope. A first CRO trigger pulse is produced when a recorded transmitter trigger pulse occurs during the time period that the recorded receiver select signal is of a first state. The second CRO trigger pulse is produced when a recorded transmitter trigger pulse occurs during the time period that the recorded receiver select signal is of a second state. By selectively applying these CRO trigger pulses to the cathode-ray oscilloscope, each sweep of the electron beam is intensity modulated by the receiver signal from either the first or the second receiver. By photographically reproducing each such sweep of the electron beam in side-by-side relationship, there is produced a variable-density log of the particular receiver whose signals are intensity modulating the electron beam in response to the selected CRO trigger pulses.

In a further aspect, the transmitter trigger pulses, receiver signals, receiver select signals, and depth pulses are recorded on a video tape recorder. The video head speed is controlled by a source of reference pulses. There is also recorded a control signal, the rate of which is representative of the rate of the reference pulses. Upon playback of the magnetic tape, the video head speed is controlled by the control signal whereby the receiver signals are played back at the rate at which they were recorded and time is therefore preserved.

DESCRIPTION OF THE PREFERRED EMBODIMENT

Figure 1:
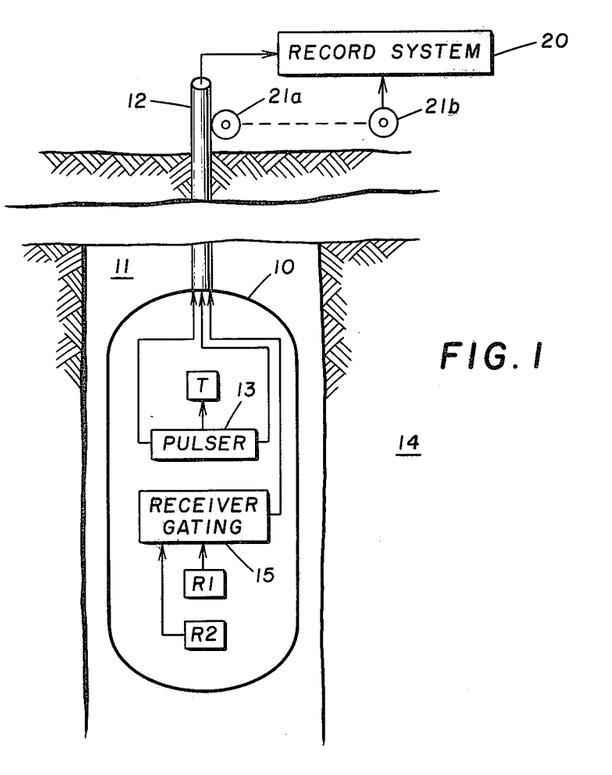
FIG. 1 illustrates a borehole logging tool with which the recording system of the present invention may be utilized.

Referring to FIG. 1, there is shown a borehole logging tool 10 suspended within the borehole 11 by means of logging cable 12. Tool 10 includes a transmitter T and two receivers R1 and R2. A pulser circuit 13 energizes transmitter T to transmit high-frequency acoustic pulses into the surrounding earth formation 14. For each acoustic cycle the pulser 13 sends a transmitter trigger pulse uphole by way of the cable 12. The acoustic pulses are detected by receivers R1 and R2. During the first acoustic cycle, the receiver gating circuit 15 sends the detected signal from receiver R1 uphole by way of cable 12. During the next acoustic cycle, the receiver gating circuit 15 sends the detected signal from receiver R2 uphole by way of cable 12. These cycles are repeated, with successive acoustic pulses being detected by the two receivers and the receiver outputs being selectively gated for sending the detected pulses uphole. The receiver gating circuit 15 also sends a receiver select signal uphole by way of cable 12, indicating which receiver output is being gated at any given time. For a more detailed description and operation of such a borehole logging tool, reference may be made to the aforementioned U.S. Pat. No. 3,302,166 to Joseph Zemanek, Jr. The signals received uphole from a logging tool as described in the Joseph Zemanek, Jr., patent are illustrated in FIGS. 2A–2C.

Figures 2A, 2B, 2C, 2D, 2E, 2F, 2G, 2H, 2I, 2J, 2K:
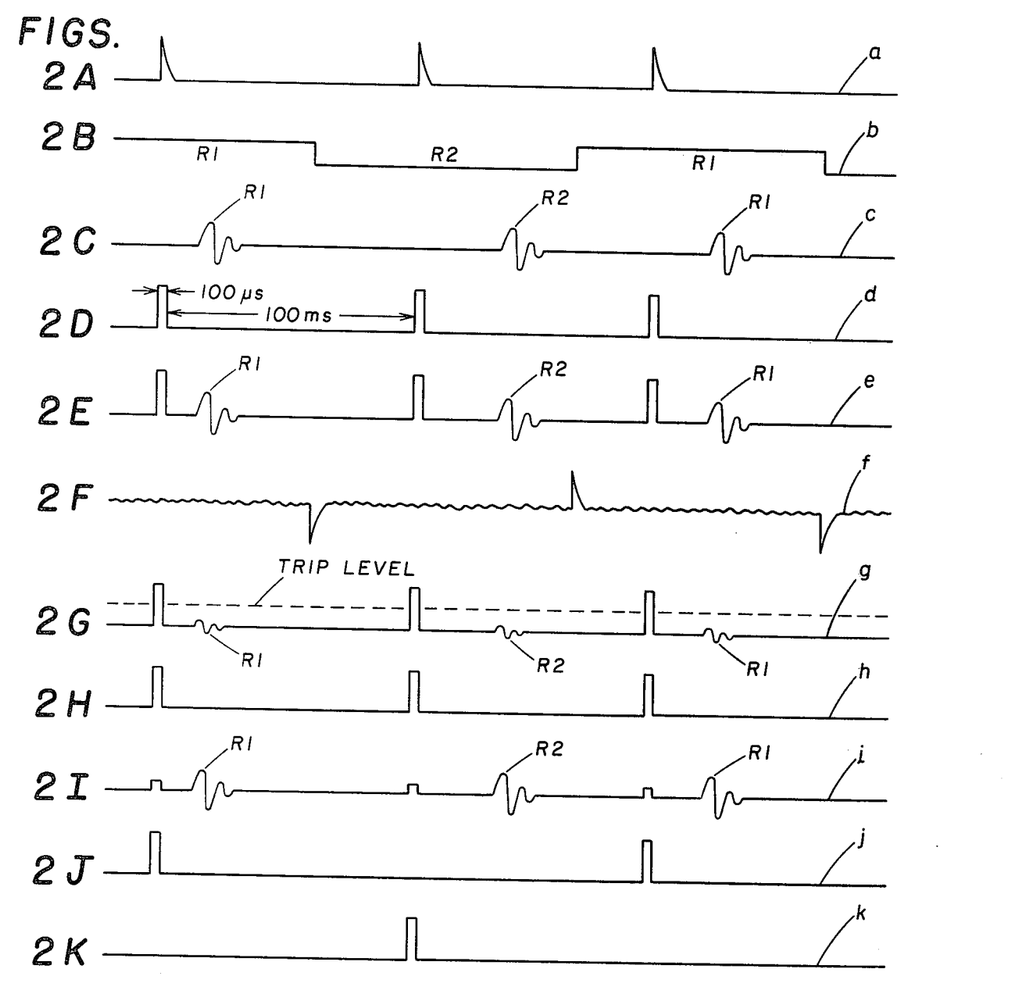
FIGS. 2A–2K and 7 illustrate waveforms of signals generated by both the logging tool of FIG. 1 and the recording system of the present invention.

FIG. 2A illustrates the transmitter trigger pulse produced by the pulse 13 each time the transmitter T is fired. FIG. 2B illustrates the receiver select signal from the receiver gating circuit 15 which identifies the receiver whose output is being sent uphole. FIG. 2C illustrates the selected receiver output which is being sent uphole.

These transmitter trigger pulses, receiver signals, and receiver select signals are recorded by the recording system 20 as a function of the depth of the tool within the borehole. Driven by the logging cable 12 is a depth converter including a sheave 21a and a shaft encoder 21b that converts the mechanical rotation of the sheave to depth pulses. These depth pulses are recorded by the recording system 20 along with the transmitter trigger pulses, receiver signals, and receiver select signals.

It is the specific feature of the present invention to provide a new and improved recording system for recording the signals received from such a borehole logging tool as illustrated in FIG. 1.

Figure 3:
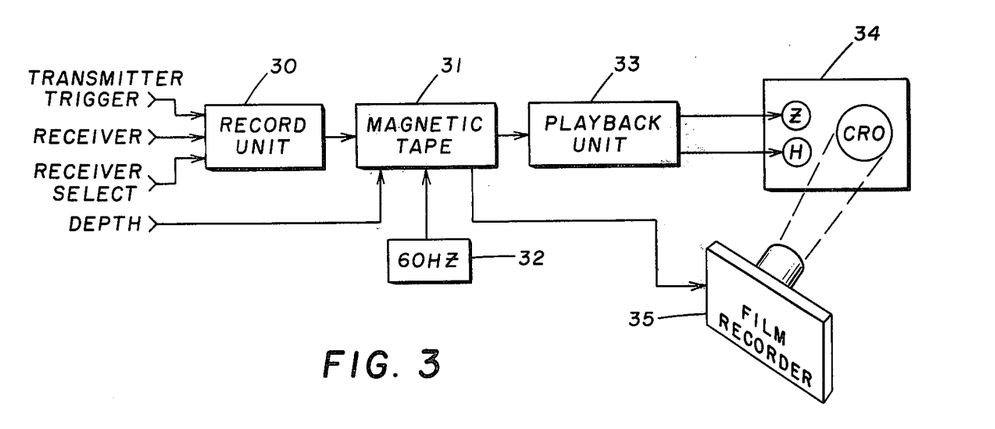
FIG. 3 is a block diagram of the recording system of the present invention.

Referring now to FIG. 3, there is illustrated in block diagram form the recording system of the present invention. During field operations, the transmitter trigger pulse, the receiver signal, and the receiver select signal from the borehole tool are all applied to a record unit 30. These pulses and signals are processed by the record unit 30 for recording on the magnetic tape unit 31 along with the depth pulses from the borehole tool. During recording operations in the field, these units 30 and 31 are supplied with 60-hertz power from a portable power supply 32. After the logging operation is completed, the magnetic tape may be taken to a processing center where the data recorded on the tape may be further processed through a playback unit 33 to an output device such as, for example, cathode-ray oscilloscope (CRO) 34. Further, the CRO display, such as the illustration of FIG. 7, may be recorded on the film recorder 35, with the movement of the film across the face of the CRO being synchronized with the recorded depth pulses.

In the preferred embodiment of the recording system, the magnetic tape unit 31, the CRO 34, and the film recorder 35 are conventional components. A Sony EV-210 Videocorder manufactured by the Sony Corporation, Tokyo, Japan, is utilized as the magnetic tape unit 31. The Videocorder has four recording channels: a video channel, a control channel, and two audio channels. During recording operations in the field, this magnetic tape unit is interfaced with the borehole tool 10 through the record unit 30 such that the high-frequency transmitter trigger pulses and receiver signals are recorded on the video channel, the depth signal is recorded on one audio channel, the receiver select signal is recorded on the other audio channel, and timing control signals synchronized with the 60-hertz power supply 32 are recorded on the control channel.

In recording such signals, the magnetic tape speed of the Videocorder is 7.8 inches per second and the speed of the recording head drum is 1,800 revolutions per minute. The video head-to-tape speed is 590 inches per second. The high-frequency response of the recording tracks of the video channel is 2 megahertz. The frequency response of the two audio channels and the control channel is 50–12,000 hertz.

A Tektronix Oscilloscope, Model 461, supplied by Tektronix, Inc., Beaverton, Ore., is used as the CRO 34.

A Beattie Magazine Camera, Model DSV 13302, with a Beattie Periscope, Model 13301, supplied by Beattie-Coleman, Inc., of Anaheim, Calif., is used as the film recorder 35.

Having now described the conventional components of the recording system 20, the record unit 30, playback unit 33, and 60-hertz power supply 32 of the present invention will now be described in detail in conjunction with FIGS. 4A, 4B, 5, and 6.

Figure 4A:
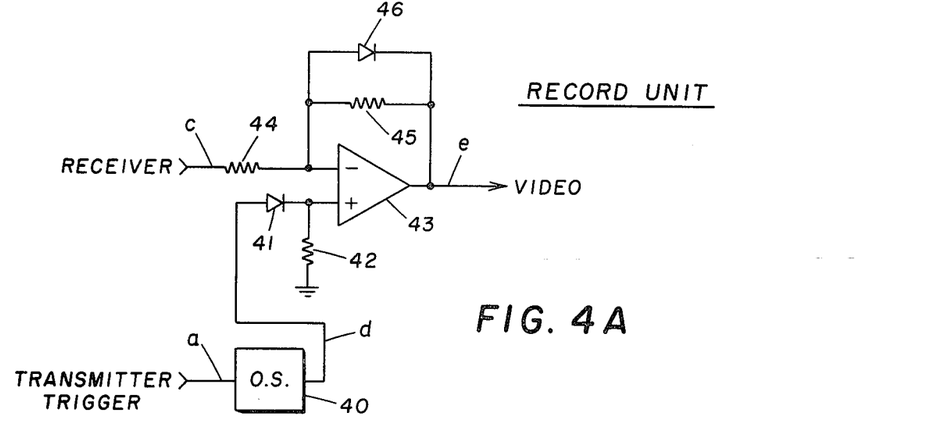
FIGS. 4A, 4B, 5, 6A, and 6B are electrical schematics of portions of the block diagram of FIG. 3.

Referring now to the record unit 30, each transmitter trigger pulse from the downhole tool 10, as illustrated by the waveform $a$ in FIG. 2A, is applied to the one-shot multivibrator 40 of FIG. 4A. Multivibrator 40 produces a 100$\mu$s-wide pulse in response to each transmitter trigger pulse. In a preferred operation, the transmitter is fired every 100 milliseconds. Accordingly, the transmitter trigger pulses from the pulser 13 are occurring every 100 milliseconds. The output waveform of the multivibrator 40 is illustrated as waveform $d$ in FIG. 2D. These 100-microsecond pulses are applied through diode 41 to the non-inverting input of the operational amplifier 43. The receiver signal from the borehole tool is applied to the inverting input of operational amplifier 43 by way of resistor 44, this signal being illustrated by waveform $c$ in FIG. 2C. Operational amplifier 43, along with the feedback resistor 45 and diode 46, mixes the 100-microsecond transmitter trigger pulses and the receiver signal to provide a composite video signal which is applied to the video channel input of the magnetic tape unit 31. This composite video signal is illustrated by waveform $e$ in FIG. 2E.

Figure 4B:
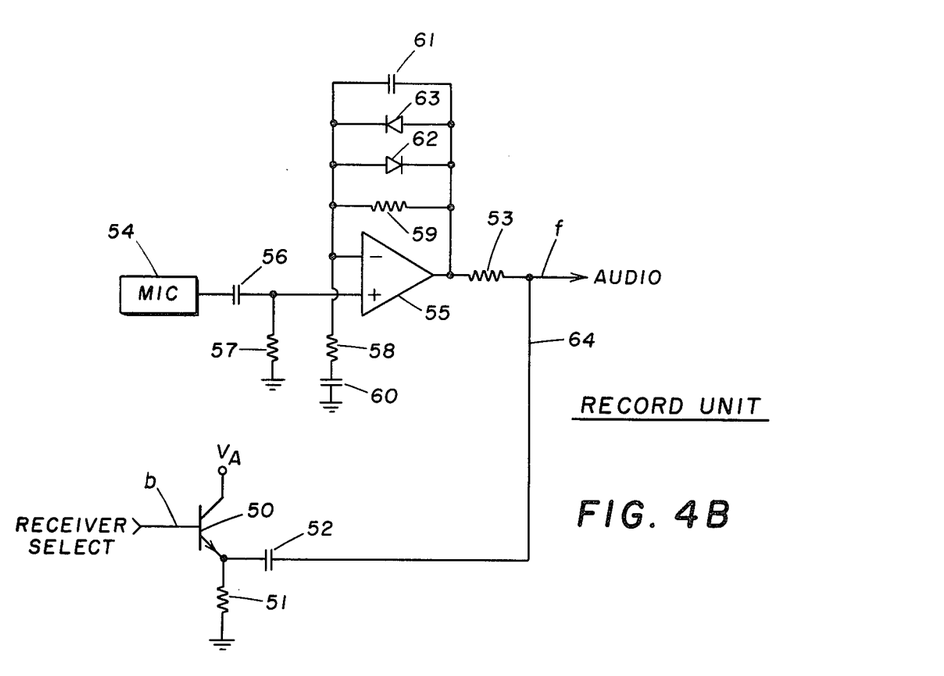

Referring now to FIG. 4B, there is illustrated the circuitry for processing the receiver select information from the borehole tool 10, as illustrated by waveform $b$ in FIG. 2B. The receiver select signals are applied through an emitter follower, consisting of transistor 50 and resistor 51, and through capacitor 52 to the output line 64. Mixed with this signal by way of resistor 53 is voice information picked up by a microphone 54. The microphone output is applied to the non-inverting input of operational amplifier 55 by way of a coupling network consisting of capacitor 56 and resistor 57. Gain conditions are established by way of resistors 58 and 59 and capacitors 60 and 61. The diodes 62 and 63 serve to limit the amplifier's output to prevent the microphone information from obscuring the receiver select information should unusually loud voices or sounds be picked up by the microphone. The amplifier's output is applied through resistor 53 to line 64 where it is mixed with the receiver select signal from transistor 50 to form the composite audio signal illustrated by waveform $f$ in FIG. 2F. This composite audio signal is applied to one of the audio channels of the magnetic tape unit 31.

Applied to the other audio channel of the magnetic tape unit 31 are the depth pulses from the depth indicator 21.

During the recording operation just described, it is important that the recording time be accurately preserved. As there is usually no accurate 60-hertz power available at the recording site, it is a specific aspect of the present invention to provide a crystal-controlled power source 32 for driving the magnetic tape unit 31 at a constant recording speed. Timing control signals derived from this 60-hertz source are recorded by the magnetic tape unit on the control channel for later use at the processing center in playing the recorded signals at the rate at which they were recorded.

Figure 5:
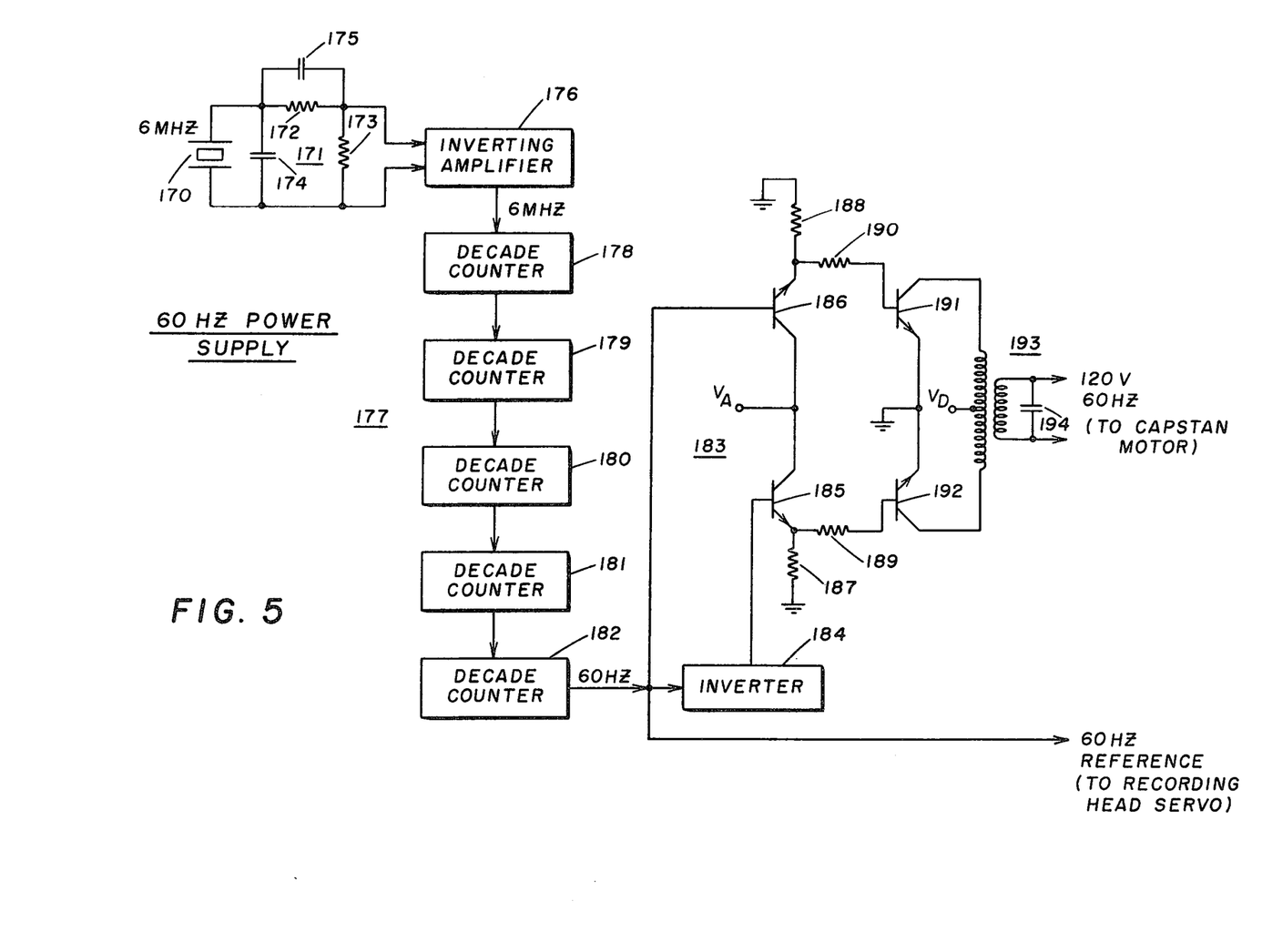

Referring now to FIG. 5, there is illustrated in detail the 60-hertz power source 32 for use during the recording operation. A 6-megahertz crystal 170, a filter 171 including resistors 172 and 173, capacitors 174 and 175, and an inverting amplifier stage 176 form a 6-megahertz oscillator. The 6-megahertz output from amplifier stage 176 is counted down through a five-stage decade counter 177 comprising the five decade counters 178–182 to a 60-hertz square wave-reference signal.

This 60-hertz reference signal is utilized in two ways. Firstly, it is applied directly to the magnetic tape unit as a reference for the viedo head servo motor. Secondly, it is amplified by the push-pull amplifier stage 183 including the inverter 184, the transistors 185 and 186, and the resistors 187–190. The output from this push-pull amplifier drives the power-driven transistors 191 and 192 whose output is connected to the primary of transformer 193. Transformer 193 and shunting capacitor 194 provide a 120-volt, 60-hertz signal for driving the capstan motor of the magnetic tape unit 31.

Figures 6A, 6B:
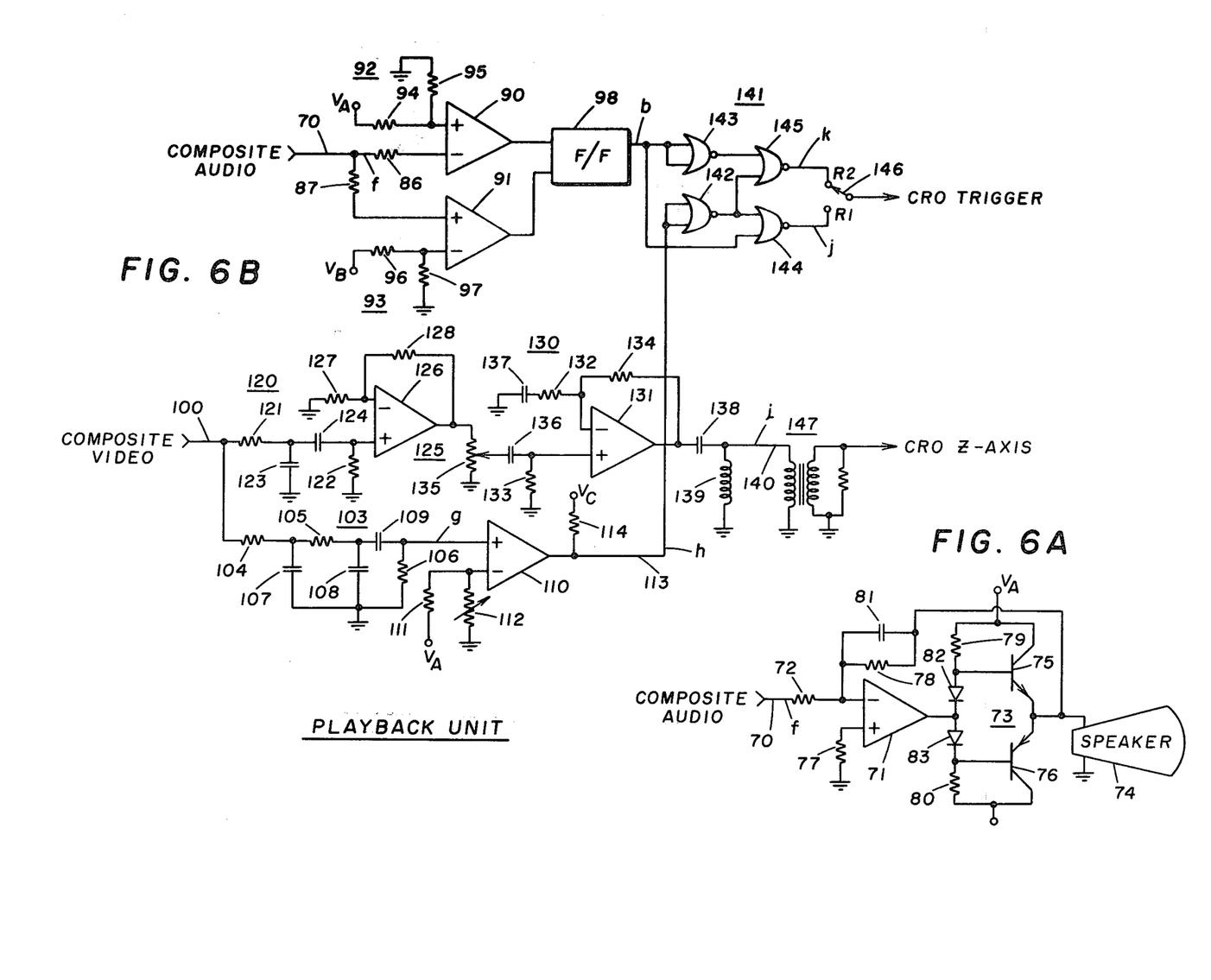

Having now described the recording operation carried out at the borehole site, the playback operation to be carried out at the processing center will be described. In the playback operation, the magnetic tape unit 31 is interfaced with the CRO 34 through the playback unit 33. Referring now to FIGS. 6A and 6B, there is illustrated in detail the playback unit 33.

The composite audio signal (i.e., the combination of the receiver select signal and the microphone output) is applied from the magnetic tape unit 31 during playback onto input line 70 of the playback unit 33 of FIGS. 6A and 6B. FIG. 2F illustrates the waveform $f$ of the composite audio signal as reproduced by the magnetic tape unit during playback.

Line 70 applies this composite audio signal to the inverting input terminal of operational amplifier 71 of FIG. 6A by way of resistor 72. The output of amplifier 71 is applied through the power amplifier 73 to drive the speaker 74. Power amplifier 73 includes the complementary-connected transistors 75 and 76. Bias conditions for amplifier 73 are supplied from voltage supplies $V_A$ and $V_B$ by way of resistors 79 and 80 and diodes 82 and 83. Resistors 72 and 78 and capacitor 81 establish the gain conditions for amplifiers 71 and 73. The output of speaker 74 is the voice information which was picked up by the microphone 54 of the record unit 30 during logging operations.

Line 70 also applies this composite audio signal to the two comparators 90 and 91 by way of resistors 86 and 87, respectively, of FIG. 6B. These two comparators function as level detectors with input threshold levels set by the voltage dividers 92 and 93. Voltage divider 92 includes resistors 94 and 95 which set the input threshold of comparator 90 from power supply $V_A$. Similarly, voltage divider 93 includes resistors 96 and 97 which set the input threshold of comparator 91 from power supply $V_B$. The output from comparator 90 is a negative pulse whenever a positive-going spike in the composite audio signal exceeds the input threshold level of comparator 90. Similarly, the output from comparator 91 is a negative pulse whenever a negative-going spike exceeds the input threshold level of comparator 91. These two outputs are utilized to set and reset the flip-flop 98. Accordingly, the output of flip-flop 98 is a reproduction of the receiver select signal illustrated by waveform $b$ in FIG. 2B.

Also applied to playback unit 33 is the composite video signal from magnetic tape unit 31. This composite video signal is applied by line 100 to both a trigger enhancement circuit 103 and to a signal enhancement circuit 120. The trigger enhancement circuit 103 is a high-pass filter which enhances the high-frequency component of the composite video signal, which is the transmitter trigger pulse, and suppresses the lower frequency component, which is the receiver signal. This filter includes resistors 104–106 and capacitors 107–109. The filtered video signal is illustrated by waveform $g$ in FIG. 2G and is applied to the non-inverting input of comparator 110 where it is compared to a trip level applied to the inverting input from voltage source $V_A$ by way of a voltage divider including resistor 111 and the variable resistor 112. This trip level is illustrated on waveform $g$ in FIG. 2G and is set such that only the transmitter trigger pulse will trip the comparator to provide an output signal on line 113, output biasing being through resistor 114 from power supply $V_C$. This output signal is illustrated by waveform $h$ in FIG. 2H.

The signal enhancement circuit 120 suppresses the transmitter trigger pulse to enhance the receiver signal. The signal enhancement circuit is a bandpass filter including resistors 121 and 122 and capacitors 123 and 124. The filtered signal is applied to amplifier 125. This amplifier includes the operational amplifier 126 and feedback network resistors 127 and 128. Amplifier 125 amplifies the filtered signal while preserving signal linearity. Amplifier 130, including operational amplifier 131, resistors 132–134, variable resistor 135, capacitors 136–138, and inductor 139, further amplifies the signal to provide a receiver signal on line 140 as illustrated by waveform $i$ in FIG. 2I. As previously discussed, the acoustic pulses recorded in this manner represent, alternately, the R1 receiver signal and the R2 receiver signal. Consequently, to allow the continuous recording of a single receiver signal in the form of a log so that changes in the signal can be seen as the borehole tool traverses the borehole, the output recorder must be synchronized with the reproduction of the receiver select signal produced by the borehole tool.

In the preferred embodiment described herein, including the CRO 34 and film recorder 35, the trigger of the horizontal sweep of the CRO is selected by either the R1 or R2 portion of the receiver select signal. This selection is accomplished by the operation of the CRO trigger select circuit 141. The output signal from the comparator 110 on line 113 is applied by way of gate 142 to one input of each of the gates 144 and 145 of CRO trigger select circuit 141. Applied to the second input of gate 144 is the receiver select signal from flip-flop 98. This receiver select signal is also applied by way of gate 143 to the second input of gate 145. The output from either gate 144 or gate 145 may be selected by the setting of switch 146 for applying a CRO trigger pulse to the horizontal input of the CRO. When the switch 146 is set to the R1 position, the gating operation of CRO trigger circuit 141 operates to apply a trigger pulse to the CRO in response to a transmitter trigger pulse occurring during the time periods of the R1 receiver select signal, this trigger pulse being illustrated by waveform $i$ in FIG. 2J. Consequently, each successive R1 receiver signal will intensity modulate the electron beam sweep of the CRO, while the CRO remains untriggered during the periods of the R2 receiver signal. Conversely, when the switch 146 is set to the R2 position, the CRO is triggered in response to a transmitter trigger pulse occurring during the time periods of the R2 receiver select signal so that only the R2 receiver signal intensity modulates the electron beam sweep, this trigger pulse being illustrated by waveform $k$ in FIG. 2K. To interface the receiver signal on line 140 to the CRO 34 there is provided the output transformer 147.

Figure 7:
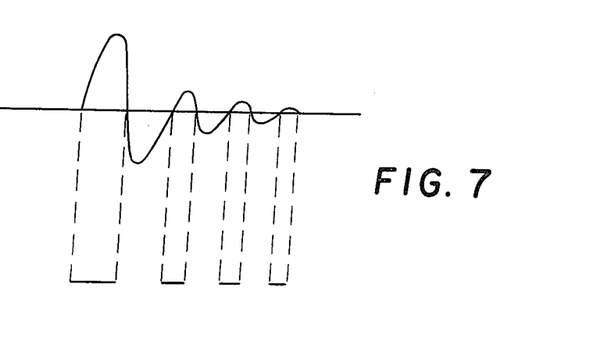

By applying the CRO trigger pulse to the external trigger input of the CRO and the receiver signal to the Z-axis modulation input of the CRO, there is displayed on the face of the CRO a variable-density trace of the selected receiver signal as is illustrated in FIG. 7. As the depth pulses from the magnetic tape unit 31 drive the film recorder 35, the film moves as a function of the movement of the borehole tool, thereby reproducing each electron beam sweep of the CRO in a side-by-side relationship on the film. This type of recording produces what is commonly known as a variable-density log. By producing a variable-density log for each of the downhole receivers and combining these logs, an indication is obtained of the acoustic characteristics of the formation surrounding the borehole.

It is to be understood that the record unit of FIGS. 4A and 4B, the 60-HZ power supply of FIG. 5, and the playback unit of FIG. 6 are merely representative of one embodiment of the present invention. In such embodiment, various types and values of circuit components may be utilized. In accordance with the specific embodiments of FIGS. 4A, 4B, 5, and 6, the following TABLE I sets forth specific types and values of the circuit components.

TABLE I

| Reference Designation | Description |
|---|---|
| Operational amplifiers 43, 55, 71, and 126 | 747A (Fairchild) |
| Operational amplifiers 90, 91, and 110 | 734 (Fairchild) |
| Operational amplifier 131 | 741 (Fairchild) |
| Diodes 41, 46, 62, and 63 | 1N914 (Fairchild) |
| Transistors 76 | 2N1132 (Fairchild) |
| Multivibrator 40 | 74121 (Texas Instruments) |
| Flip-flop 98 | 7474 (Texas Instruments) |
| NOR gates 142–145 | 7402 (Texas Instruments) |
| Transistors 50, 75, 185, and 186 | 2N2102 (R.C.A.) |
| Transistors 191 and 192 | 2N1490 (R.C.A.) |
| Decade counters 178–182 | CD4018 (R.C.A.) |
| Inverting amplifier 176 | CD4007 (R.C.A.) |

TABLE I-continued

| Reference Designation | Description |
|---|---|
| Inverter 184 | CD4011 (R.C.A.) |
| Diodes 82 and 83 | 1N4006 (R.C.A.) |
| Crystal 170 | 6 MHZ (International Crystal) |
| Transformer 193 | TY-76A (Triad Manufacturing) |
| Transformer 147 | MTH-7 (Microtran) |
| Choke 139 | 15 MHY (Thordason) |
| Microphone 54 | Realistic 395 (Radio Shack) |
| Speaker 74 | ½W, 8 ohm (Archer) |
| Encoder 21b | T-0200D (Trump-Ross) |
| Resistors 44, 57, 59, 77, 111, 122, 133, and 134 | 100 Kohms |
| Resistors 45, 79, 80, 94, 96, and 121 | 10 Kohms |
| Resistors 51, 53, 58, 114, 186, and 187 | 1 Kohm |
| Resistor 172 | 13 Kohms |
| Resistor 173 | 22 Mohms |
| Resistors 189 and 190 | 68 ohms |
| Resistors 42, 86, 87, 95, 97, and 106 | 4.7 Kohms |
| Resistors 127 and 132 | 20 Kohms |
| Resistor 128 | 470 Kohms |
| Resistor 104 | 47 ohms |
| Resistor 105 | 470 ohms |
| Resistors 72 and 78 | 200 Kohms |
| Variable resistor 112 | 5 Kohms |
| Variable resistor 135 | 25 Kohms |
| Capacitor 174 | 10 pf |
| Capacitor 175 | 20 pf |
| Capacitor 194 | 4 $\mu$f |
| Capacitors 81 and 109 | 470 pf |
| Capacitor 123 | .0015 $\mu$f |
| Capacitors 124 and 108 | .001 $\mu$f |
| Capacitor 137 | 1 $\mu$f |
| Capacitors 56, 105, and 136 | .01 $\mu$f |
| Capacitor 61 | .022 $\mu$f |
| Capacitors 52 and 138 | .1 $\mu$f |
| Power supply $V_A$ | +15 V |
| Power supply $V_B$ | −15 V |
| Power supply $V_C$ | +5 V |
| Power supply $V_D$ | +12 V |

We claim:
1. An acoustic velocity logging system comprising:
   a. a transducer assembly adapted for movement through a borehole, including:
      i. a transmitter of acoustic pulses,
      ii. a pulse generator for energizing said transmitter and for producing a transmitter trigger pulse each time said transmitter is energized,
      iii. first and second receivers located at different, spaced-apart, axial distances from said transmitter, each receiver producing an output signal representative of the acoustic pulses traveling through the formation surrounding the borehole from the transmitter to the receiver,
      iv. means for selectively providing one of said receiver signals along with each of said transmitter trigger pulses and for providing a receiver select signal of a first state when the output from said first receiver is being provided and of a second state when the output from said second receiver is being provided,
   b. means located uphole from the transducer assembly for recording said transmitter trigger pulses, said receiver signals, and said receiver select signal,
   c. means for gating said recorded transmitter trigger pulses and said recorded receiver select signal to provide first and second trigger pulses in response to recorded transmitter trigger pulses occurring during the time periods that said recorded receiver select signal is in said first and second states, respectively, d. a cathode-ray oscilloscope,
e. means for applying said recorded receiver signals to the intensity modulation input of said cathode-ray oscilloscope, and
f. means for selectively applying either said first or second trigger pulses to the horizontal sweep input of said cathode-ray oscilloscope to trigger the sweep of the electron beam of the cathode-ray oscilloscope whereby each sweep of the electron beam is modulated to produce a variable-density display of the recorded receiver outputs from either said first or second receiver.

2. The system of claim 1 wherein said means for recording said transmitter trigger pulses, said gated receiver signals, and said receiver select signal includes a magnetic tape recorder having a video channel for recording said transmitter trigger pulses and said receiver signals and an audio channel for recording said receiver select signals.

3. The system of claim 2 further including means for combining said transmitter trigger pulses and said receiver signals into a composite video signal for recording on the video channel of said magnetic tape recorder.

4. The system of claim 3 further including:
a. a microphone for recording voice information, and
b. means for combining said voice information and said receiver select signal into a composite audio signal for recording on the audio channel of said magnetic tape recorder.

5. The system of claim 3 wherein said recording means further includes:
a. a first filter to which said recorded composite video signal is applied during playback, said first filter suppressing the frequency component of said composite video signal that is representative of said transmitter trigger pulses to thereby provide a first filtered signal representative primarily of said recorded receiver signal, and
b. a second filter to which said recorded composite video signal is applied during playback, said second filter suppressing the frequency component of said composite video signal that is representative of said receiver signal to thereby provide a second filtered signal representative primarily of said recorded transmitter trigger pulses.

6. The system of claim 4 wherein said recording means further includes:
a. means for separating said recorded composite audio signal into a first signal representative of said receiver select signal and a second signal representative of said voice information, and
b. a speaker to which said second signal representative of said voice information is applied for audible reproduction.

7. The system of claim 1 wherein said recording means further includes:
a. a control channel,
b. means for providing a 60-hertz signal, said 60-hertz signal controlling the recording speed of said recording means,
c. means for generating a control signal representative of said 60-hertz signal and recording said control signal on said control channel, and
d. means for utilizing said recorded control signal during playback to reproduce the recording speed.

8. The system of claim 7 wherein said means for providing a 60-hertz signal includes:
a. a crystal oscillator providing stable 6-megahertz pulses, and
b. a five-stage decade counter which counts down said 6-megahertz pulses to provide a 60-hertz square wave.

9. The system of claim 1 further including means for photograpically reproducing each successive sweep of the electron beam of the cathode-ray oscilloscope in side-by-side relationship to produce a variable-density, continuous recording for the particular receiver whose signals are modulating the electron beam in response to said trigger pulses.

10. In a borehole logging system having a transducer assembly including a transmitter for producing bursts of acoustic energy pulses and a plurality of receivers for producing signals representative of said acoustic pulses traveling from said transmitting means to each of said plurality of receiving means through the formation adjacent the borehole as the assembly is moved through the borehole, a method for recording and displaying said signals, comprising:
a. producing a source of first reference pulses,
b. recording said signals on magnetic tape at the rate of said first reference pulses,
c. recording a control signal on said magnetic tape, the rate of said control signal being representative of the rate of said first reference pulses,
d. recording receiver select signals to indicate the receiver whose signal is being recorded at any given time,
e. applying successively recorded receiver signals to the intensity modulation input of a cathode-ray oscilloscope, and
f. triggering the electron beam sweep of the cathode-ray oscilloscope in response to those recorded receiver select signals that identify the time periods on said recording during which signals from a common receiver have been recorded whereby successive electron beam sweeps are intensity modulated with successive receiver signals from a common receiver.

* * * * *